United States Patent [19]

Taniguchi et al.

[11] Patent Number: 4,862,201
[45] Date of Patent: Aug. 29, 1989

[54] PHOTOGRAPHIC CAMERA

[75] Inventors: Nobuyuki Taniguchi; Yoshiaki Hata, both of Nishinomiya; Manabu Inoue, Kobe; Yoshinobu Kudo, Sakai; Takeo Hoda, Kawachinagano; Hiroshi Ueda, Toyokawa, all of Japan

[73] Assignee: Minolta Camera Kabushiki Kaisha, Osaka, Japan

[21] Appl. No.: 203,508

[22] Filed: Jun. 7, 1988

Related U.S. Application Data

[63] Continuation of Ser. No. 928,025, Nov. 7, 1986, abandoned.

[30] Foreign Application Priority Data

Nov. 11, 1985 [JP] Japan ................... 60-252473
Nov. 11, 1985 [JP] Japan ................... 60-252474

[51] Int. Cl.$^4$ ............................. G03B 17/24
[52] U.S. Cl. ................... 354/105; 354/106; 354/21; 354/275
[58] Field of Search ........... 354/21, 105, 106, 109, 354/275

[56] References Cited

U.S. PATENT DOCUMENTS

| | | | |
|---|---|---|---|
| 3,490,844 | 1/1970 | Sapp | 355/40 |
| 4,001,846 | 1/1977 | Kauneckas | 354/105 |
| 4,182,110 | 1/1980 | Kamiwaki et al. | |
| 4,402,588 | 9/1983 | Khait et al. | 354/106 |
| 4,583,831 | 4/1986 | Harvey | 354/106 |
| 4,639,111 | 1/1987 | Harvey | 354/106 |
| 4,647,170 | 3/1987 | Stone | 354/275 |
| 4,650,304 | 3/1987 | Harvey | 354/21 |
| 4,652,104 | 3/1987 | Harvey | 354/106 |
| 4,662,736 | 5/1987 | Taniguchi et al. | |
| 4,682,870 | 7/1967 | Atkinson | |

FOREIGN PATENT DOCUMENTS

| | | | |
|---|---|---|---|
| 0222364 | 5/1987 | European Pat. Off. | 354/105 |
| 42-4107 | 2/1967 | Japan | |
| 42-19723 | 10/1967 | Japan | |
| 42-27171 | 12/1967 | Japan | |
| 42-27172 | 12/1967 | Japan | |
| 54-26721 | 2/1979 | Japan | |
| 60-145428 | 9/1985 | Japan | |

OTHER PUBLICATIONS

Shashin Kogyo, Feb. 1966, pp. 35–41.
Modern Photography, Mar. 1966, pp. 79, 100 (article).
Modern Photography, Dec. 1966, p. 101 (article).

*Primary Examiner*—Russell E. Adams
*Attorney, Agent, or Firm*—Burns, Doane, Swecker & Mathis

[57] ABSTRACT

A photographic camera system including a mode setting device for selectively setting the system to a real focal length photographing mode for printing an ordinary photographic zone and a pseudo focal length photographing mode for printing a zone narrower than the ordinary photographic zone, a recording device for recording on a film information corresponding to a set one of the real and pseudo focal length photographing modes and a data imprinting device for imprinting data such as date in a printing zone on the film not only when the system has been set to the real focal length photographing mode but when the system has been set to the pseudo focal length photographing mode.

5 Claims, 13 Drawing Sheets

PHOTOGRAPHIC CAMERA

This application is a continuation of application Ser. No. 928,025, filed Nov. 7, 1986, now abandoned.

BACKGROUND OF THE INVENTION

1. Field of the Invention

The present invention relates to a photographic camera, and more particularly to a photographic camera for enabling pseudo telephoto and pseudo panoramic prints to be obtained from normal exposures by coding an exposure to identify a selected type print.

2. Description of the Prior Art

Conventionally, for example, Japanese Patent Laid-Open Publication No. 26721/1979, U.S. Patent No. 4,583,831 and U.S. Patent No. 3,490,844 have proposed a photographic camera system constituted by a camera which is provided with an operating member capable of designating, in each frame of a film, a printing zone to be printed, at the time of photographing an object, in the vicinity of the image plane of the film a data indicative of the printing zone and a printer which reads the data for each frame from the film photographed by the camera so as to print the designated printing zone on the basis of the data. In photographic camera systems of the above described type, in the case where the printing zone is so designated at the time of photographing an object as to be narrower than an ordinary printing zone and a print is made by enlarging size of the print to that of an ordinary print at the time of printing the film, the zone narrower than that of the ordinary print is enlarged in the print and thus, the print is equivalent to a print photographed by an objective lens having a focal length longer than that of the objective lens of the camera. Therefore, an effect substantially equivalent to an effect gained upon change of the focal length of the objective lens can be advantageously achieved.

Meanwhile, recently, cameras provided with a data imprinting device for imprinting at an end portion in the frame, data such as date of photographing an object are widely commercially available. Then, if the data imprinting device is provided in the camera of the above described type, such a phenomenon may undesirably take place that in the case where a printing zone narrower than an ordinary printing zone has been designated at the time of photographing objects, data imprinted on the film are not printed on the printing paper.

Furthermore, in the photographic camera systems of the above described type, it is so arranged that when a pseudo focal length photographing mode is selected, a horizontally elongated zone obtained by reducing at an identical ratio both vertical and horizontal dimensions of a printing zone to be printed in a real focal length photographing mode is printed. Therefore, if a vertically elongated print is required to be obtained by using such camera, so-called vertical position photography should be performed by rotating the camera through 90° about the optical axis of the objective lens. However, such a problem arises in vertical position photography that it becomes difficult to manipulate operating members such as a shutter release button, thereby resulting in deterioration of operating efficiency of the camera. Meanwhile, a flash device for flash photography is usually provided on an upper portion of the camera body so as to illuminate an object from above the camera body. Thus, when vertical position photography is performed by using the flash device, the object is illuminated horizontally in the print and thus, there is such a possibility that an improper print is obtained due to formation of unnatural shadows in the print.

SUMMARY OF THE INVENTION

Accordingly, an essential object of the present invention is to provide a photographic camera which is capable of imprinting chronometric data such as date in a printing zone of each frame of a film not only in a real focal length photographing mode but in a pseudo focal length photographing mode.

Another important object of the present invention is to provide a photographic camera by which a proper print having a larger vertical dimension can be easily obtained without changing posture of its camera body, thereby eliminating such inconveniences as deterioration of operating efficiency of the photographic camera and improper printing due to formation of unnatural shadows in the print.

In order to accomplish these objects of the present invention, a photographic camera system according to the present invention comprises: a mode setting means for selectively setting said photographic camera system to a real focal length photographing mode for printing an ordinary photographic zone and a pseudo focal length photographing mode for printing a zone narrower than the ordinary photographic zone; a recording means for recording on a film information corresponding to a set one of the real focal length photographing mode and the pseudo focal length photographing mode; and a data imprinting means for imprinting chronometric data such as date in a printing zone on the film not only when said photographic camera system has been set to the real focal length photographing mode but when said photographic camera has been set to the pseudo focal length photographing mode.

BRIEF DESCRIPTION OF THE DRAWINGS

These objects and features of the present invention will become apparent from the following description taken in conjunction with the preferred embodiment thereof with reference to the accompanying drawings, in which.

Before the description of the present invention proceeds, it is to noted that like parts are designated by like reference numerals throughout several views of the accompanying drawings.

DETAILED DESCRIPTION OF THE INVENTION

Figure 1:
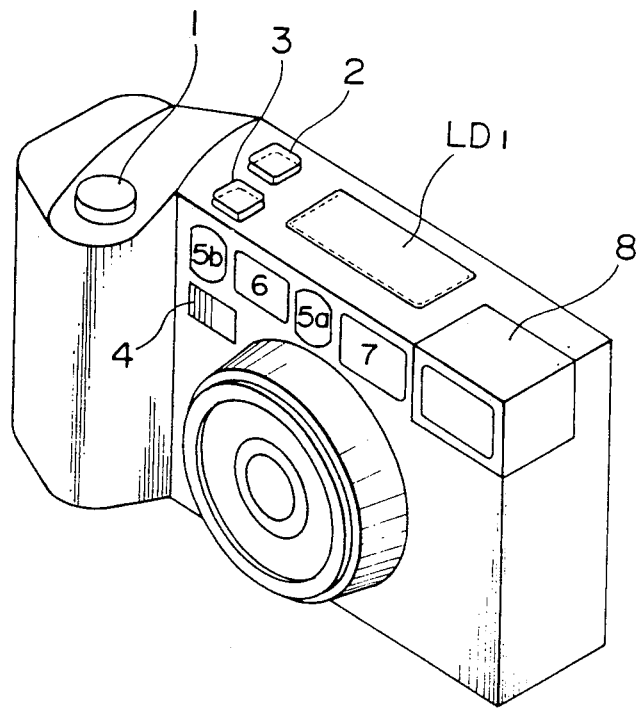
FIG. 1 is a perspective view of a camera according to one preferred embodiment of the present invention.

Referring now to the drawings, there is shown in FIGS. 1 to 4, a camera according to one preferred embodiment of the present invention. The camera includes a shutter release button 1, an imprinting mode changeover button 2 for selecting whether or not chronometric data such as date are imprinted on a film and for selecting the chronometric data to be imprinted on the film, a mode selecting button 3 for selecting one of a real focal length photographing mode and a pseudo focal length photographing mode, a self-timer switch 4, a pair of distance measuring windows 5a and 5b, a light receiving window 6 for a viewfinder, a viewfinder window 7, a flash device 8 and a liquid crystal display unit LD1 for displaying the imprinting data and photographic data such as the photographing modes. In the imprinting mode changeover button 2, one of imprinting modes "OFF", "Year, month, day" and "Day, hour, minute" can be selected. Meanwhile, the liquid crystal display unit LD1 is disposed on an upper face of the camera.

Figure 2:
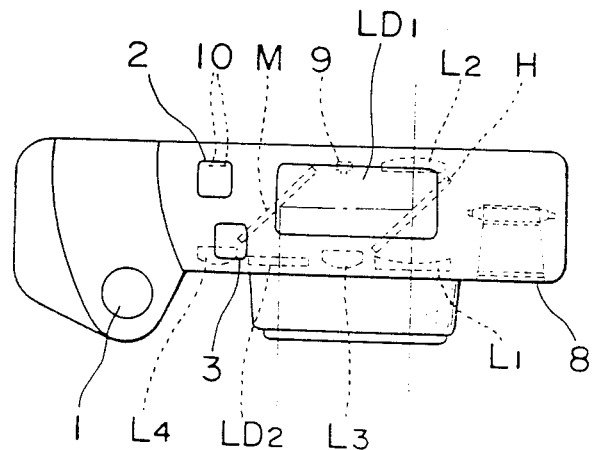
FIG. 2 is a top plan view of the camera of FIG. 1.

FIG. 2 is a top plan view of the camera and shows also a viewfinder optical system. In FIG. 2, reference character LD2 denotes a liquid crystal display unit for changing over size of a frame of the viewfinder between the real focal length photographing mode and the pseudo focal length photographing mode, which will be described in detail later. The viewfinder optical system is an inverted Galileian type optical system constituted by an objective lens L1 having a negative refracting power and an eyepiece L2 having a positive refracting power, which are disposed rearwardly of the viewfinder window 7. A half mirror H is disposed between the objective lens L1 and the eyepiece L2. Light transmitted through the liquid crystal display unit LD2 disposed rearwardly of the light receiving window 6 for the viewfinder is reflected by a mirror M so as to be lead to the viewfinder by the half mirror H.

On the other hand, a light emitting diode 9 for distance measurement is disposed rearwardly of the distance measuring window 5a so as to project, through a projection lens L3, infrared light on an object to be photographed. Then, the light reflected from the object is received, by way of a light receiving lens L4 disposed rearwardly of the distance measuring window 5b, by a pair of distance measuring photo detectors 10 such that a distance between the camera and the object is measured on the basis of a light receiving state of the distance measuring photo detectors 10. Since this distance measuring principle is already known, detailed description thereof is abbreviated for the sake of brevity.

Figure 3:
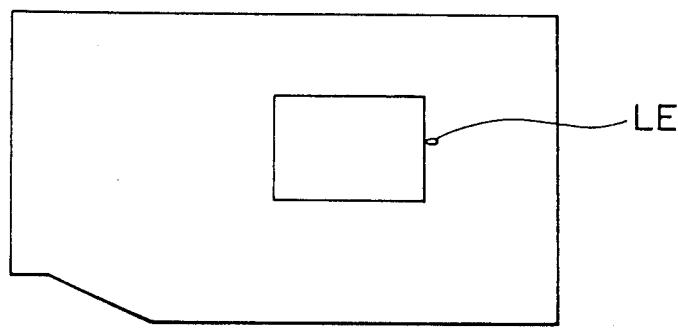
FIG. 3 is a rear elevational view of the camera of FIG. 1 when its back cover is open.

FIG. 3 shows an inside of the camera as observed from the side of the film by opening a back cover of the camera. Reference character LE denotes a light emitting diode for recording on the film an indication that photography in the pseudo focal length photographing mode has been performed.

Figure 4:
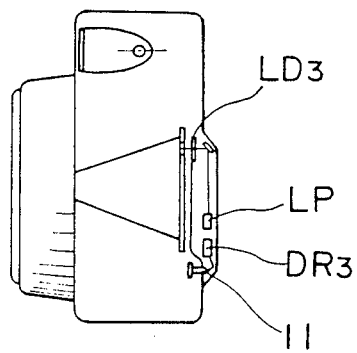
FIG. 4 is a schematic vertical sectional view of the camera of FIG. 1.
Figure 5:
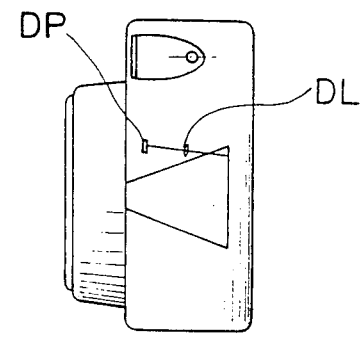
FIG. 5 is a view similar to FIG. 4, particularly showing a modification thereof.

FIG. 4 is a vertical sectional view of the camera and shows an optical path for imprinting data on the film. In FIG. 4, reference characters LD3 and LP denote a liquid crystal display unit for imprinting data on the film and a lighting lamp for imprinting chronometric data on the film, respectively. The liquid crystal display unit LD3 and the lighting lamp LP are so disposed to imprint data in a printing zone on the film even if the pseudo focal length photographing mode is designated. Reference character DR3 denotes a driver circuit of the liquid crystal display unit LD3, while reference numeral 11 denotes a connector for transmitting signals between an electric circuit of the camera body and the driver circuit DR3 as well as the lighting lamp LP. In the arrangement shown in FIG. 4, data are imprinted on the film from the rear side of the film. However, it can also be so arranged as shown in FIG. 5 that data are imprinted on the film from the front side of the film. In FIG. 5, reference character DP denotes a data plate bearing data to be imprinted on the film and reference character DL denotes an image forming lens for forming an image of the data on the face of the film.

Figure 6:
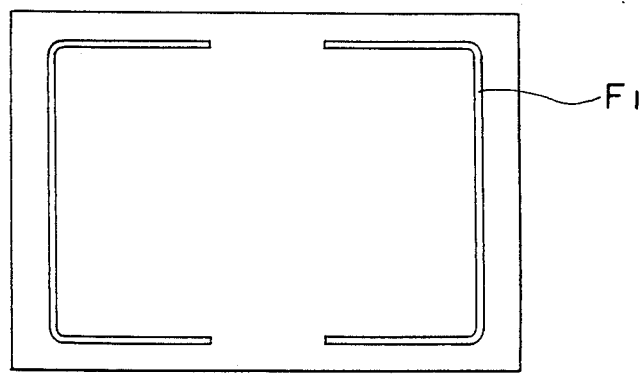
FIGS. 6, 7 and 8 are views showing indications displayed in a viewfinder of the camera of FIG. 1, respectively.
Figure 7:
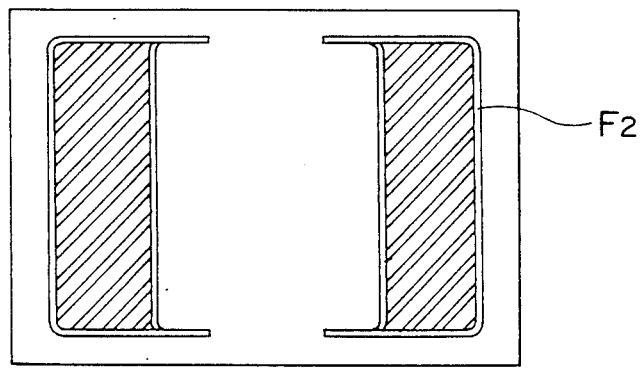
Figure 8:
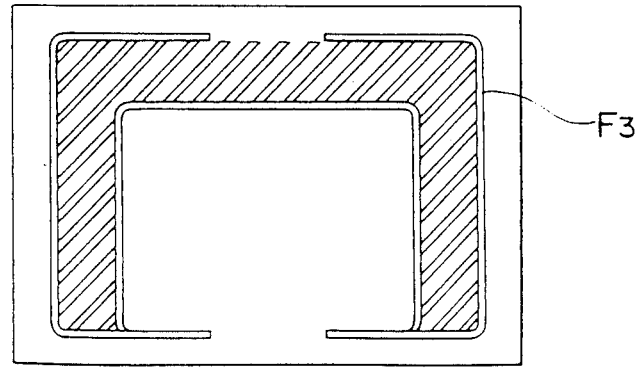

FIGS. 6, 7 and 8 show indications displayed by the liquid crystal display unit LD2 disposed in the optical path of the viewfinder. Initially, at the time of the real focal length photographing mode, a frame F1 having a size corresponding to that of an ordinary picture frame is displayed in the viewfinder as shown in FIG. 6. Then, at the time of the pseudo focal length photographing mode, only a portion to be printed is displayed in the viewfinder by one of frames F2 and F3 according to trimming methods as shown in FIGS. 7 and 8, respectively. Namely, FIG. 7 shows a vertically elongated printing zone in a vertically elongated pseudo focal length photographing mode for obtaining a print having a larger vertical dimension. Meanwhile, FIG. 8 shows a horizontally elongated printing zone in a horizontally elongated pseudo focal length photographing mode for reducing vertical and horizontal dimensions of the frame F1 by maintaining the horizontal dimension to be larger than the vertical dimension. Here, in the case of the vertically elongated pseudo focal length photographing mode, the printing zone is set to a size corresponding to a half size of an ordinary 35 mm film. Data such as date to be imprinted on the film are so positioned as to be imprinted in the printing zone on the film even if the camera is set to any one of the vertically elongated pseudo focal length photographing mode and the horizontally elongated pseudo focal length photographing mode. Hereinbelow, only he vertically elongated pseudo focal length photographing mode is described in this embodiment of the present invention. However, it is needles to say that the present invention can be applied to the horizontally elongated pseudo focal length photographing mode and an arrangement enabling changeover between the vertically elongated pseudo focal length photographing mode and the horizontally elongated pseudo focal length photographing mode.

Figure 9:
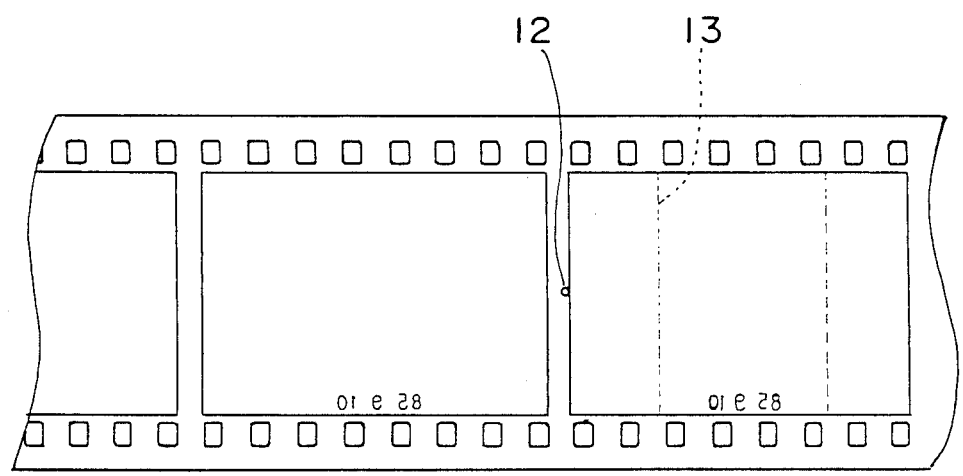
FIG. 9 is a view showing a film photographed by the camera of FIG. 1.

FIG. 9 shows the film photographed by the camera of the present invention as observed from the side of its face having emulsion coated thereon. In FIG. 9, reference numeral 12 shows a mark for commanding trimming of the film, which has been imprinted on the film by the light emitting diode LE of FIG. 3. At this time, if this frame of the film corresponds to the zone designated by the vertically elongated pseudo focal length photographing mode of FIG. 7, a zone shown by dotted lines 13 is printed. The date indicates September 10, 1985 and is imprinted in the printing zone at all times even if the pseudo focal length photographing mode is designated.

Figure 10:
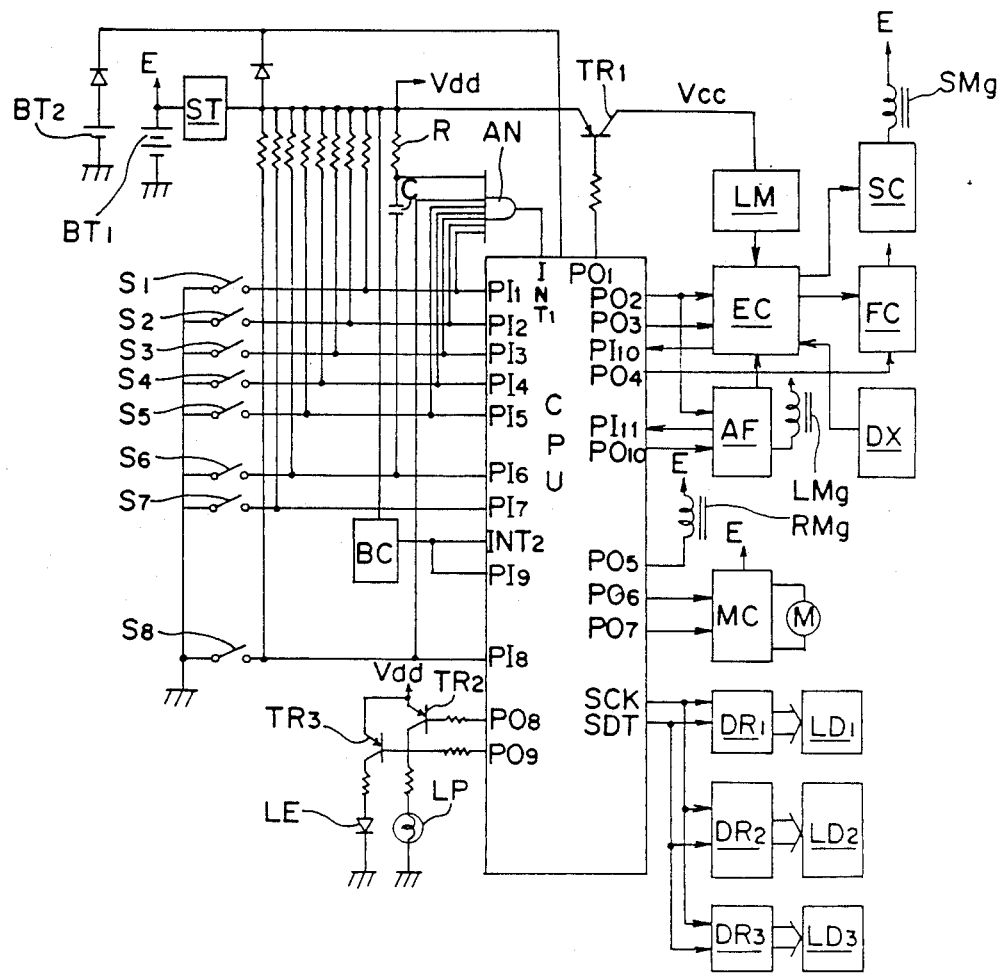
FIG. 10 is an electric circuit diagram of an electric circuit employed in the camera of FIG. 1.

FIG. 10 shows an electric circuit of the camera of the present invention. In FIG. 10, a microcomputer CPU includes input ports PIx, output ports POx and interruption input terminals INT1 and INT2 in which reference character x denotes natural numbers, i.e. 1, 2, 3 and so on. It is so arranged that interruption from the interruption input terminal INT1 is performed upon detection of negative edge of an input signal, while interruption from the interruption input terminal INT2 is performed upon change of voltage of the input signal. The microcomputer CPU includes a serial clock output terminal SCK for outputting clock pulses and a serial data output terminal SDT for outputting display data. Electric power is supplied to the microcomputer CPU by a backup battery BT2 and a regulator ST for boosting voltage of a main battery BT1.

The microcomputer CPU has a function of effecting sequence control of the camera, a function of formulating display data, a function of recording information on the film and a timing function for calendar. It is so arranged that when the voltage of the main battery BT1 has been rather consumed, the microcomputer CPU effects only the timing function for calendar by detecting drop of the voltage of the main battery BT1 in response to input of an output of a voltage detecting circuit BC for detecting drop of the voltage of the main battery BT1, to the input terminal PI9 such that consumption of the backup battery BT2 is minimized.

In FIG. 10, reference characters S1 and S2 denote switches to be turned on at a first stage and a second stage of depression of the shutter release button 1, respectively. Reference character S3 denotes a photographing mode changeover key switch to be closed and opened in response to the mode selecting button 3. The key switch S3 is arranged to be alternately set to the vertically elongated pseudo focal length photographing mode (FIG. 7) and the real focal length photographing mode (FIG. 6) upon each depression of the mode selecting button 3. A winding switch S4 is turned on upon start of shutter release operation and is turned off upon completion of winding of the film. A self-timer setting switch S5 for setting the self-timer photographing mode is operatively associated with the self-timer switch 4. When the self-timer setting switch S5 is in the on state, the self-timer photographing mode is set for actuating the self-timer. A switch S6 is operatively associated with opening and closing of the back cover of the camera. Namely, the switch S6 is in the on state and the off state when the back cover is opened and closed, respectively. A switch S7 is turned off and on when the film has been wound properly and improperly, respectively. Meanwhile, an imprinting mode changeover key switch S8 is opened and closed in operative association with the imprinting mode changeover button 2. It is so arranged that the camera is cyclically changed over to the imprinting modes "OFF", "Day, hour, minute" and "Year, month, day" in this sequence upon each depression of the imprinting mode changeover button 2. Differential outputs produced upon turning on of the switches S1, S2, S3, S4, S5 and S8 and upon changeover of the switch S6 from the off state to the on state are applied to the interruption input terminal INT1 of the microcomputer CPU through an AND gate AN so as to interrupt the microcomputer CPU. Reference characters R and C denote a resistor and a capacitor, respectively. The resistor R and the capacitor C constitute a differential circuit for generating a differential signal which assumes the LOW level momentarily when the switch S6 is turned on from the off state upon opening of the back cover of the camera.

The output terminal PO1 of the microcomputer CPU is connected to a power supply control transistor TR1 to be described later so as to supply electric power to various circuits through a power source line Vcc upon electrical conduction of the transistor TR1. The output terminal PO2 is connected to an exposure calculating and controlling circuit EC so as to apply to the exposure calculating and controlling circuit EC a release signal for actuating a shutter control magnet SMg. The output terminal PO3 is also connected to the exposure calculating and controlling circuit EC so as to apply to the exposure calculating and controlling circuit EC a start signal for starting operation of storage of a signal regarding brightness of the object, which signal is transmitted from a light measuring circuit LM to the exposure calculating and controlling circuit EC. The output terminal PO4 is connected to a flash control circuit FC so as to input to the flash control circuit FC a control signal for controlling boosting operation of a boosting circuit for boosting a main capacitor of the flash device 8.

Further, the output terminal PO5 of the microcomputer CPU is connected to a lens shift start magnet RMg excited so as to start the shift of the objective lens in the direction of the optical axis. The magnet RMg is excited by a lens shift start signal so as to start the shift of the objective lens. This shift of the objective lens is stopped upon excitation of a lens stop magnet LMg controlled by a distance measuring and lens control circuit AF.

The output terminals PO6 and PO7 are connected to a motor control circuit MC for controlling a motor M for winding the film so as to input to the motor control circuit MC a winding signal for winding the film and a brake signal for stopping rotation of the motor M. The output terminals PO8 and PO9 are, respectively, connected to transistors TR2 and TR3 to be described later. Meanwhile, the output terminal PO10 outputs a start signal for starting actuation of the distance measuring and lens control circuit AF.

On the other hand, the input terminals PI1 to PI8 are, respectively, directly connected to the switches S1 to S8 referred to above. Meanwhile, the input terminal PI9 is connected to an output terminal of the voltage detecting circuit BC for detecting drop of the voltage of the main battery BT1. Furthermore, a signal indicating completion of exposure is inputted from the exposure calculating and controlling circuit EC to the input terminal PI10 of the microcomputer CPU. A signal indicating completion of actuation of the distance measuring and lens control circuit AF is inputted to the input terminal PI11.

The light measuring circuit LM measures brightness of the object so as to transmit to the exposure calculating and controlling circuit EC a signal indicative of brightness of the object. The exposure calculating and controlling circuit EC not only calculates exposure in accordance with the signal indicative of brightness of the object but outputs a shutter control signal to a shutter control circuit SC on the basis of result of the calculation of exposure such that the magnet SMg for closing the shutter is controlled by the shutter control circuit SC. Meanwhile, in the case of flash photography for using the flash device 8, the exposure calculating and controlling circuit EC performs flash calculation on the basis of a distance measuring signal concerning a distance between the camera and the object so as to control turning on of the flash device 8 through the flash control circuit FC. The distance measuring signal is outputted to the exposure calculating and controlling circuit EC by the distance measuring and lens control circuit AF. The distance measuring and lens control circuit AF not only measures the distance between the camera and the object but controls an object distance of the objective lens through control of the magnet LMg for positioning the objective lens on the basis of the measured value of the distance between the camera and the object.

A circuit DX reads a film speed signal stored on a film cartridge and outputs the film speed signal to the exposure calculating and controlling circuit EC. The film speed signal is expressed in a value base on ISO (International Organization for Standardization). The lens shift start magnet RMg functions also as a release magnet controlled by the output terminal PO5 of the microcomputer CPU. By holding the magnet RMg in the on state for a predetermined time period, release operation of the shutter is started. The winding signal for winding the film and the brake signal for stopping rotation of the film winding motor M are, respectively, inputted from the output terminals PO6 and PO7 of the microcomputer CPU to the motor control circuit MC for controlling the motor M. A liquid crystal display unit LD1 and its driver circuit DR1 are provided for displaying on the upper face of the camera body. A liquid crystal display unit LD2 and its driver circuit DR2 are provided for displaying a frame of field view in the viewfinder. Meanwhile, a liquid crystal display unit LD3 and its driver circuit DR3 are provided for imprinting data on the film. Each of the driver circuits DR1, DR2 and DR3 is provided with an input portion for serial communication and a memory portion for storing data. It is so arranged that when data have been inputted to each of the driver circuits DR1, DR2 and DR3, data in the memory portion are also rewritten such that contents of the memory portion are displayed.

The transistor TR2 is provided for driving a light source LP for imprinting data on the film. Meanwhile, the transistor TR3 is provided for actuating the light emitting diode LE for recording on the film the indication that the vertically elongated pseudo focal length photographing mode has been set. The transistors TR2 and TR3 are controlled by the output terminals PO8 and PO9 of the microcomputer CPU, respectively. Electric power is directly supplied from the main battery BT1 to a power source line E which, in turn, supplied electric power to the magnets LMg, SMg and RMg, the film winding motor M and the flash control circuit FC. A power source line Vdd, which extends further from a power source line extending from the main battery BT1 to the regulator ST, supplied electric power to the light source LP, the light emitting diode LE, the liquid crystal display units LD1, LD2 and LD3 and the driver circuits DR1, DR2 and DR3. The power source line Vcc is controlled by the transistor TR1 connected to the output terminal PO1 of the microcomputer CPU and supplied electric power to the light measuring circuit LM, the exposure calculating and controlling circuit EC, the distance measuring and lens control circuit AF and so on.

Figure 11:
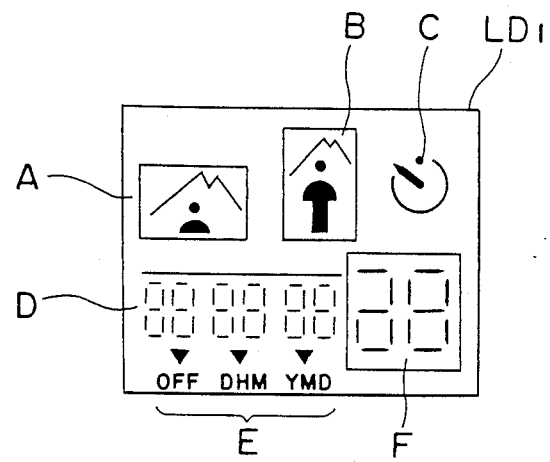
FIG. 11 is a view showing a display segment of a liquid crystal display unit employed in the camera of FIG. 1.

FIG. 11 shows a display segment of the liquid crystal display unit LD1 disposed on the upper face of the camera body. In FIG. 11, reference characters A and B denote mode display segments for displaying the photographing modes, respectively. When the real focal length photographing mode has been selected by operating the mode selecting button 3, the display segment A indicative of an image plane having a larger horizontal dimension is turned on. Meanwhile, when the vertically elongated pseudo focal length photographing mode for printing an image plane having a larger vertical dimension has been selected, the display segment B indicative of the image plane having the larger vertical dimension is turned on. A display segment C is turned on when the self-timer mode is set by the self-timer switch 4. A data display segment D for displaying chronometric data to be imprinted on the film displays "Day, hour, minute" at all times when the light measuring switch S1 is in the off state to be turned on at the first stage of depression of the shutter release button 1. Then, when the switch S1 has been turned on, a value, which is selected by the imprinting mode changeover button 2 and is imprinted as data on the film, is displayed on the data display segment D. When imprinting of chronometric data on the film is not performed, the indication "OFF" is displayed. Subsequently, when the switch S1 has been turned off again, "Day, hour, minute" is displayed again. A display segment E indicates which one of kinds of chronometric data to be imprinted on the film is selected, while reference character F denotes a counter segment for displaying the number of photographed frames of the film.

Figure 12:
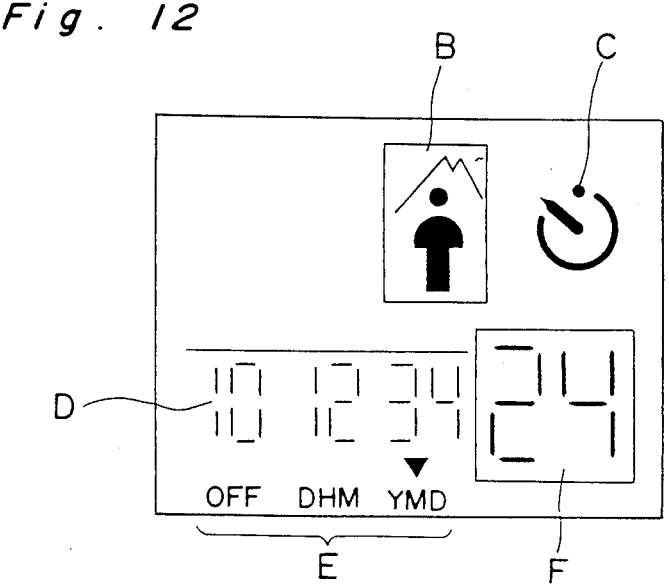
FIG. 12 is a view showing one example of display of the liquid crystal display unit of FIG. 11.
Figure 13A:
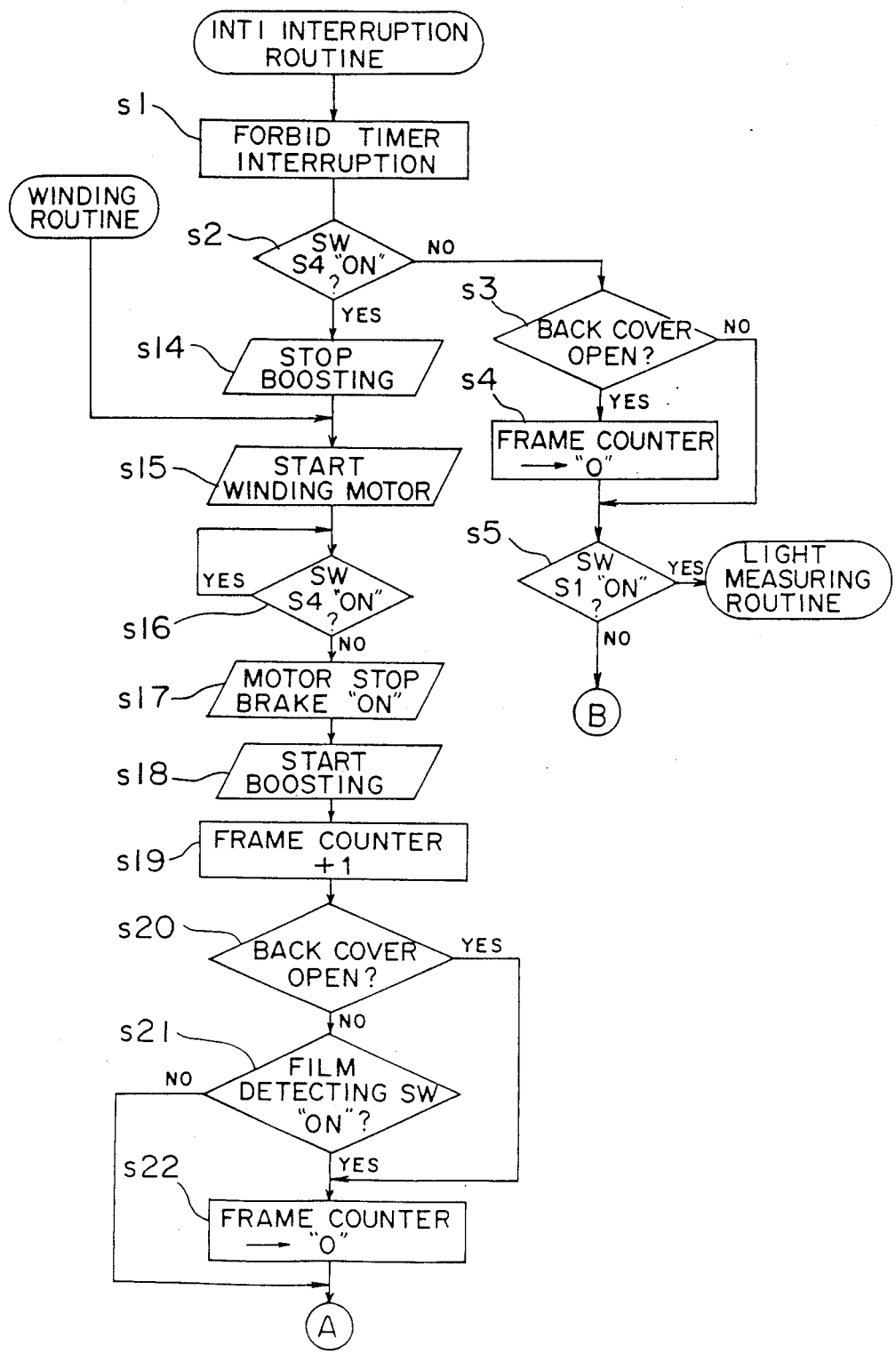
FIGS. 13 to 17 are flow charts showing operations of the camera of FIG. 1.
Figure 13B:
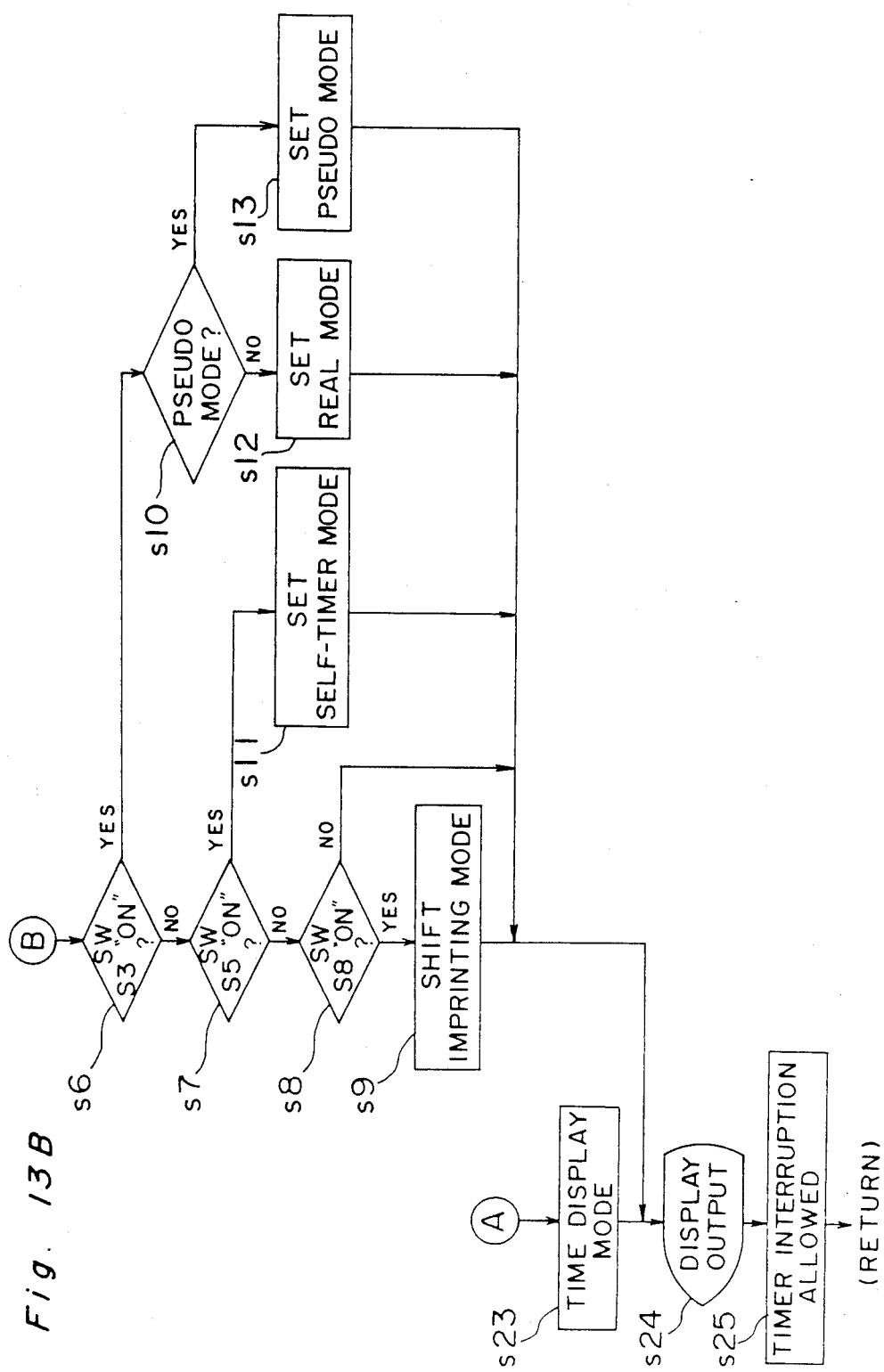

FIG. 12 shows one example of actual display of the liquid crystal display unit LD1. In FIG. 12, the vertically elongated pseudo focal length photographing mode for printing the image plane having the larger vertical dimension and the self-timer mode for using the self-timer are selected and the switch S1 is in the off state. "Day, hour, minute" represents 10, 12 and 34, respectively, i.e. 34 minutes past 12 o'clock on the 10th day and chronometric data to be imprinted on the film are "Year, month, day". Furthermore, the film is wound to a 24th frame of the film. At this time, when the switch S1 is turned on, display of the data display segment D is changed over from "Day, hour, minute" to "Year, month, day".

Hereinbelow, operations of the microcomputer CPU are described with reference to flow charts of FIGS. 13 to 17. Although not specifically shown, in order to minimize power consumption, the microcomputer CPU is held in a so-called standby state in which unnecessary internal operations are stopped. Then, when interruption is performed from the interruption input terminal INT1 upon turning on of the switch S1 and so on as described earlier, the microcomputer CPU starts its operations. Initially, when interruption from the interruption input terminal INT1 takes place, interruption by a timer is forbidden at step s1 such that subsequent processings are not suspended through interruption by the timer. Then, at step s2, a decision is made from the input port PI4 as to whether or not the interruption from the interruption input terminal INT1 is performed upon turning on of the winding switch S4. In the case of "YES" at step s2, boosting of the flash device is stopped by the output port PO4 at step s14 and then, the program flow proceeds to a winding routine. In the case of "NO" at step s2, a decision is made at step s3 as to whether or note the interruption from the interruption input terminal INT1 is performed upon opening of the back cover. In the case of "YES" at step s3, a frame counter is set to "0" at step s4.

Subsequently, at steps s5 to s8, a decision is made from the input ports PIx as to whether or not the interruption from the interruption input terminal INT1 is performed upon turning on of one of the switches S1, S3, S5 and S8. If it is found at step s5 that the interruption from the interruption input terminal INT1 is performed upon turning on of the switch S1, the program flow proceeds to a light measuring routine of FIG. 14. Meanwhile, if it is found at step s6 that this interruption is performed upon turning on of the switch S3 through operation of the mode selecting button 3, changeover of the photographing modes is performed. Namely, at step s10, a decision is made as to whether or note the pseudo focal length photographing mode is designated. In the case of "NO" at step s10, the camera is set, at step s12, to the real focal length photographing mode. In the case of "YES" at step s10, the camera is set to the pseudo focal length photographing mode.

Furthermore, if it is found at step s7 that this interruption is performed upon turning on of the self-timer setting switch S5 associated operatively with the self-timer switch 4, the camera is set to the self-timer mode at step s11. Meanwhile, if it is found at step s8 that the interruption is performed upon turning on of the switch S8 associated operatively with the imprinting mode changeover button 2, changeover of the imprinting modes is sequentially performed at step s9.

After completion of the above described confirmation of the interruption, the program flow proceeds to step s24 where a setting state of the self-timer, presence and absence of selection of the pseudo focal length photographing mode, the imprinting data and so on are displayed by outputting respective data to the liquid crystal display units LD1, LD2 and LD3 through the driver circuits DR1, DR2 and DR3. Thereafter, interruption by the timer is allowed at step s25. If interruption is requested by the timer in the above described processing sequence, the interruption by the timer is performed at this time of step s25. Then, if the interruption by the timer is not performed, the program flow is returned to a state prior to the interruption by the interruption input terminal INT1.

Figure 14:
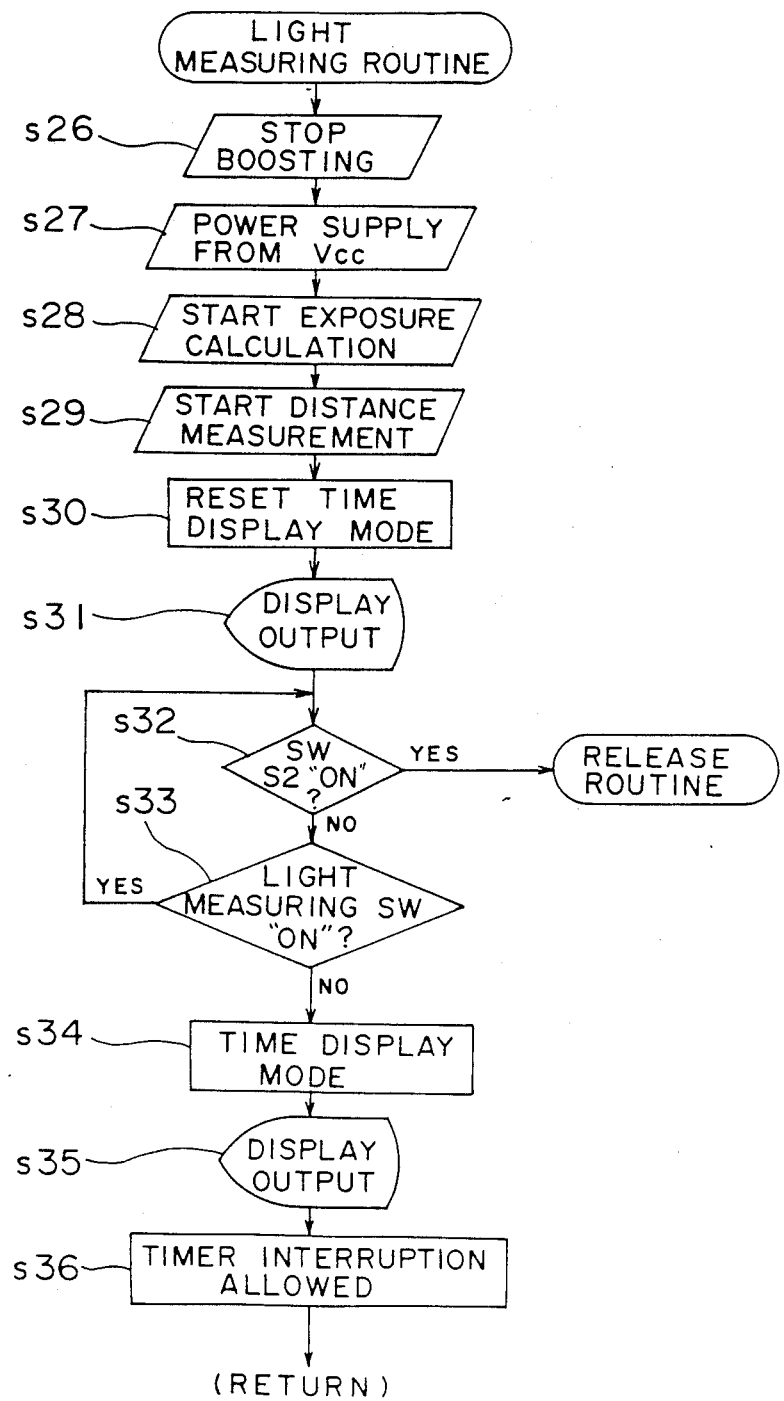

In the case of "YES" at step s5, the program flow proceeds to the light measuring routine of FIG. 14 as described above. In the light measuring routine of FIG. 14, boosting of the flash control circuit FC is initially stopped at step s26. Then, at step s27, the transistor TR1 is electrically conducted by setting the output port PO1 at the LOW level such that the electric power is supplied from the power source line Vcc to the respective circuits. At this time, the light measuring circuit LM starts light measurement when electric power is supplied from the power source line Vcc to the light measuring circuit LM. Subsequently, at step s28, a signal for starting calculating exposure is outputted from the output port PO3 to the exposure calculating and controlling circuit EC such that the circuit EC starts calculating exposure. Then, a signal for starting actuating the distance measuring and lens control circuit AF is outputted from the output port PO10 to the distance measuring and lens control circuit AF such that the distance measuring and lens control circuit AF starts detecting the distance between the camera and the object at step s29.

Subsequently, at step s30, the indication of "Day, hour, minute" displayed by the liquid crystal display unit LD1 is reset. At step s31, data based on the timing function for calendar of the microcomputer CPU, which correspond to the selected imprinting mode, are outputted to the liquid crystal display unit LD1 such that the imprinting data set at this time are displayed by the liquid crystal display unit LD1. Steps s32 and s33 are a routine for waiting until the shutter release button 1 is depressed to the second stage for turning on the release switch S2. When the release switch S2 has been turned on, the program flow proceeds to a release routine of FIG. 15. When the light measuring switch S1 is turned off without turning on of the release switch S2, the camera is again set, at step s34, to the time display mode for displaying the indication "Day, hour, minute" and then, at step s35, data based on the timing function for calendar of the microcomputer CPU, which correspond to the indication "Day, hour, minute", are outputted, so that display of the liquid crystal display unit LD1 is changed over to the indication "Day, hour, minute". Subsequently, at step s36, interruption by the timer is allowed and then, the program flow is returned to a state prior to interruption from the interruption input terminal INT1.

Figure 15:
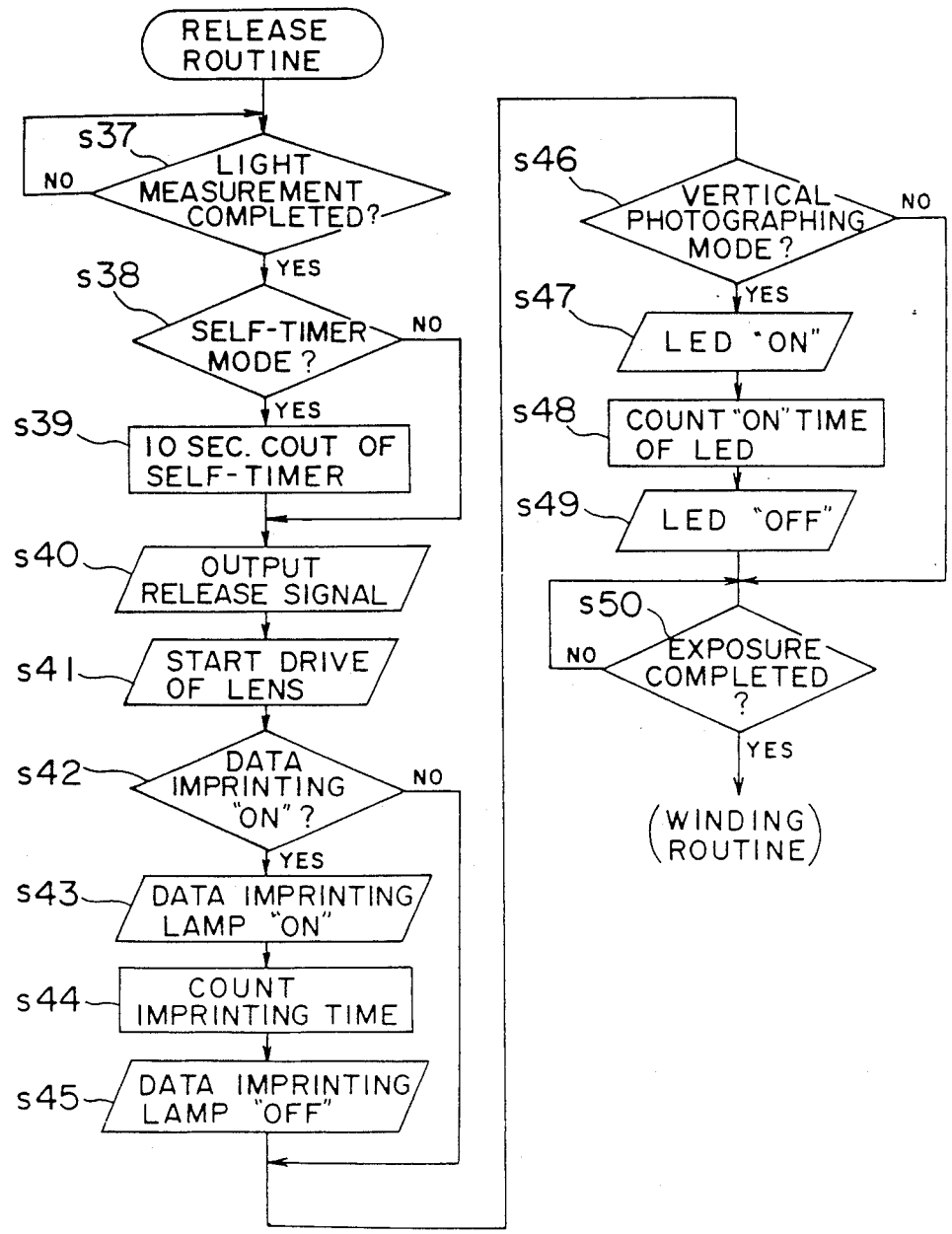

Meanwhile, if it is found at step s32 that the release switch S2 is in the on state, the program flow proceeds to step s37 of FIG. 15 at which a decision is made as to whether or not an AF completion signal indicating completion of actuation of the distance measuring and lens control circuit AF is applied to the input port PI11 after completion of actuation of the distance measuring and lens control circuit AF. In the case of "YES" at step s37, a decision is made at step s38 as to whether or not the camera is in the self-timer mode. In the case of "YES" at step s38, 10 seconds are counted by the self-timer at step s39. If the camera is not in the self-timer mode, the program flow immediately proceeds to step s40 where a release signal is outputted from the output port PO2 to the exposure calculating and controlling circuit EC. Then, at step s41, a signal is outputted from the output port PO5 so as to excite the lens shift start magnet RMg such that release of the shutter is started upon start of shift of the objective lens. When the magnet RMg has been excited, shift of the objective lens is started for focus adjustment. Amount of the shift of the objective lens is monitored by the distance measuring and lens control circuit AF and the objective lens is stopped at a proper position on the basis of result of calculation of the distance between the camera and the object by the lens stop magnet LMg. When the objective lens has been stopped, a distance signal regarding the distance between the camera and the object is transmitted from the distance measuring and lens control circuit AF to the exposure calculating and controlling circuit EC. When the distance signal is inputted to the exposure calculating and controlling circuit EC, the circuit EC delivers a shutter control signal to the shutter control circuit SC. When the shutter control circuit SC has received the shutter control signal, the shutter control circuit SC excites the shutter control magnet SMg such that opening operation of the shutter is started. Meanwhile, in the exposure calculating and controlling circuit EC, timing of de-energizing of the magnet SMg and turning on of the flash device 8 is calculated on the basis of result of calculation of exposure and result of flashmatic calculation based on the distance signal. When the timing of de-energizing of the magnet SMg and turning on of the flash device 8 has assumed a proper value, the circuit EC delivers output signals to the shutter control circuit SC and the flashlight control circuit FC.

Furthermore, while exposure control is being performed by the exposure calculating and controlling circuit EC, the microcomputer CPU records on the film a mark indicating that the pseudo focal length photographing mode has been set, and the selected imprinting data. Initially, at step s42, a decision is made as to whether or not the camera is set to the imprinting mode. In the case of "YES" at step s42, an output signal of the output port PO8 is held at the HIGH level only for a proper time period such that the light source LP is turned on at steps s43 to s45.

Subsequently, at step s46, a decision is made as to whether or not the camera is set to the vertically elongated pseudo focal length photographing mode. In the case of "YES" at step s46, the light emitting diode LE is turned on by an output signal from the output port PO9 at step s47. Then, at steps s48 and s49, a mark indicating that the vertically elongated pseudo focal length photographing mode is set is imprinted on the film. After waiting until an exposure completion signal from the circuit EC is inputted to the input port PI10, the program flow is returned to the winding routine of FIG. 13A. In the winding routine of FIG. 13A, the film winding motor M is initially started by a winding signal from the output port PO6 of the microcomputer CPU at step s15 and then, winding of the film is continued until the switch S4, which is turned off upon completion of winding of one frame of the film, is turned off at step s16. Then, when the switch S5 is turned off upon completion of winding of one frame of the film, the brake signal is transmitted from the output port PO7 to the motor control circuit MC so as to stop rotation of the motor M by braking the motor M such that the motor M is turned off.

Subsequently, at step s18, boosting of the flash control circuit FC is resumed and then, one is added to the count of the frame counter at step s19. If it is found that the back cover of the camera is opened at step s20 and the film is not wound completely at step s21, the frame counter is set to "0" at step s22 such that the count of the frame counter is not advanced. Thereafter, at step s23, the time display mode is reset and then, an output signal is delivered to the driver circuit DR1 such that the time display mode is set to the indication "Day, hour, minute". Then, at step s25, interruption by the timer is allowed such that the program flow is returned to the state prior to the interruption.

Figure 16:
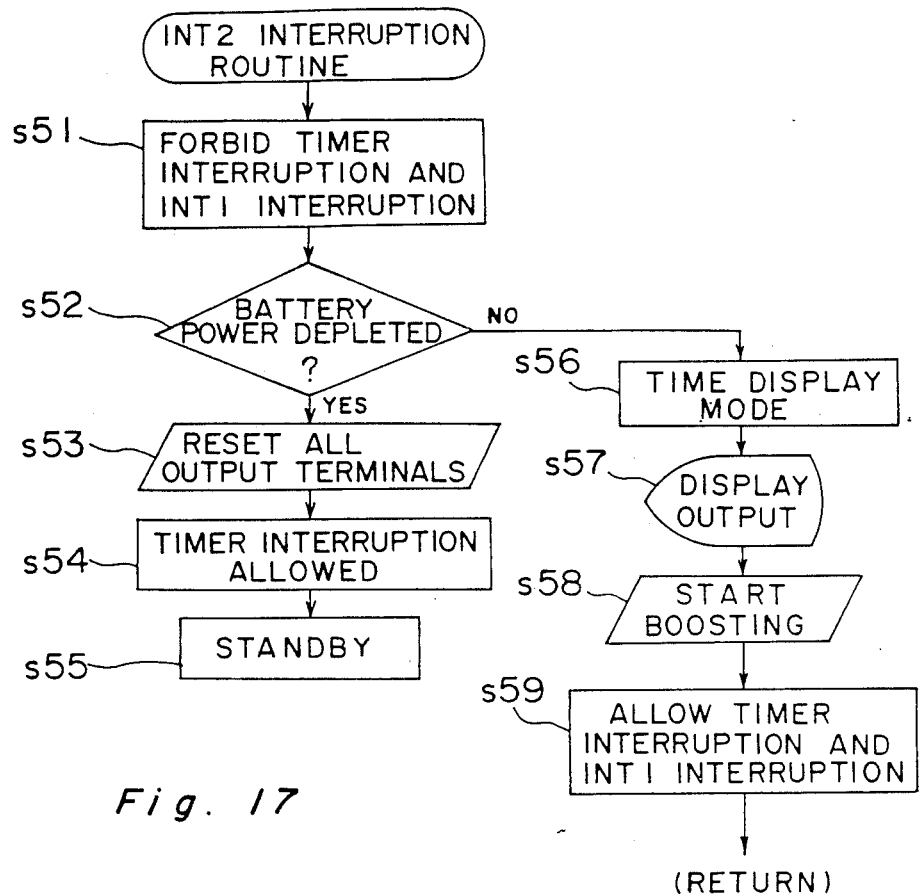

FIG. 16 shows an interruption routine started by an interruption input signal to the interruption terminal INT2. As shown in FIG. 10, an output port of the voltage detecting circuit BC is connected to the interruption terminal INT2 such that voltage of the main battery BT1 is monitored by the voltage detecting circuit BC through the regulator ST. When the voltage of the main battery BT1 detected by the voltage detecting circuit BC has dropped upon removal of the main battery BT1 from the camera body or drop of electric power of the main battery BT1 and when a new main battery BT1 has been loaded into the camera body after removal of the old main battery BT1 from the camera body, interruption from the interruption terminal INT2 takes place. When the interruption from the interruption terminal INT2 has happened, all other interruptions are forbidden at step s51. Then, at step s52, a decision is made from the input port PI9 of the microcomputer CPU as to whether the interruption is caused by drop of electric power of the main battery BT1 or upon loading of the main battery BT1 into the camera body. In the case where the interruption is caused by depletion of electric power of the main battery BT1, all the output ports POx of the microcomputer CPU are reset to the HIGH level at step s53 so as to stop operation of the camera. Then, after interruption from the interruption terminal INT1 has been prevented at step s54, the microcomputer CPU is set to standby state. At this time, only interruption from the interruption terminal INT2 upon loading of the main battery BT1 into the camera body or interruption performed by the timer to be described later resumes operation of the microcomputer CPU.

Meanwhile, if it is found at step s52 that the interruption is caused upon loading of the main battery BT1 into the camera body, the camera is reset to the time display mode for displaying the indication "Day, hour, minute" properly at step s56. Then, at step s57, the display data are outputted such that time is displayed by the liquid crystal display unit LD1. Subsequently, at step s58, a boost control signal is delivered from the output port PO4 to the flash control circuit FC so as to start boosting of the flash control circuit FC. Thereafter, all interruptions are allowed at step s59 such that the microcomputer CPU is returned to the standby state.

Figure 17:
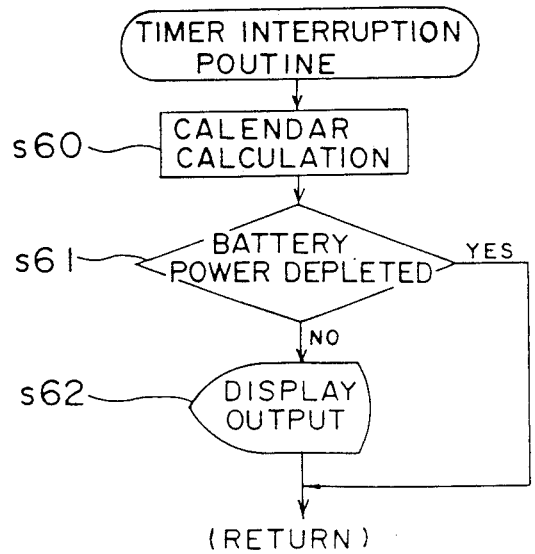

FIG. 17 shows a timer interruption routine of the timer provided in the microcomputer CPU, in which the interruption takes place every second. Thus, at step s60, calendar calculation is performed. Then, if it is found at step s61 that the main battery BT1 can supply sufficiently large electric power, the display data are outputted to the liquid crystal display unit LD1 so as to be displayed by the liquid crystal display unit LD1 at step s62 and then, the program flow returns to the original flow. Meanwhile, if it is found at step s61 that voltage of the main battery BT1 is less than a predetermined value or the main battery has been removed from the camera body, the program flow returns to the original flow without displaying the display data. At this time, even when voltage of the main battery BT1 is less than the predetermined value or the main battery BT1 has been removed from the camera body, the calendaring function of the timer interruption routine is performed by the backup battery BT2.

Figure 18:
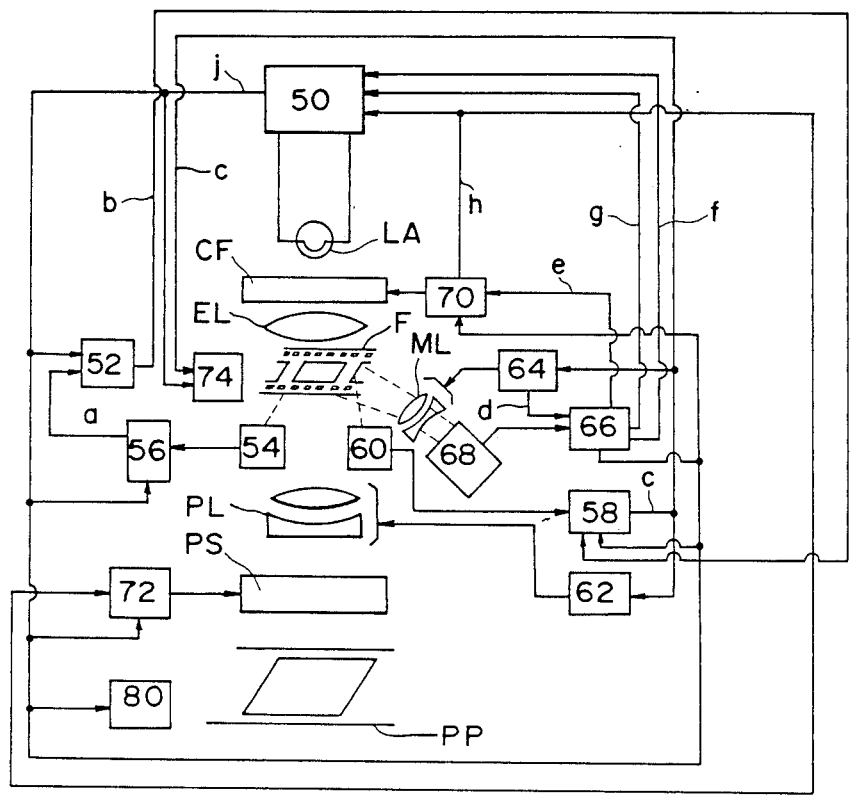
FIG. 18 is a schematic view of an automatic printer for printing the film photographed by the camera of FIG. 1.

FIG. 18 shows an automatic printer employed in a photographic camera system according to the present invention, in which the film photographed by the camera of the embodiment is automatically printed onto a photographic printing paper. In FIG. 18, reference character LA denotes a lamp for printing and reference character CF denotes a set of color filters for adjusting color balance corresponding to three primary colors of red, green and blue. Light emitted from the lamp LA is irradiated, through the color filters CF and an enlarging lens EL, onto a film F disposed at a printing position. Light transmitted through the film F is projected, via a printing zoom lens PL, onto a photographic printing paper PP such that image recorded on the film F is printed onto the photographic printing paper PP.

Figure 19:
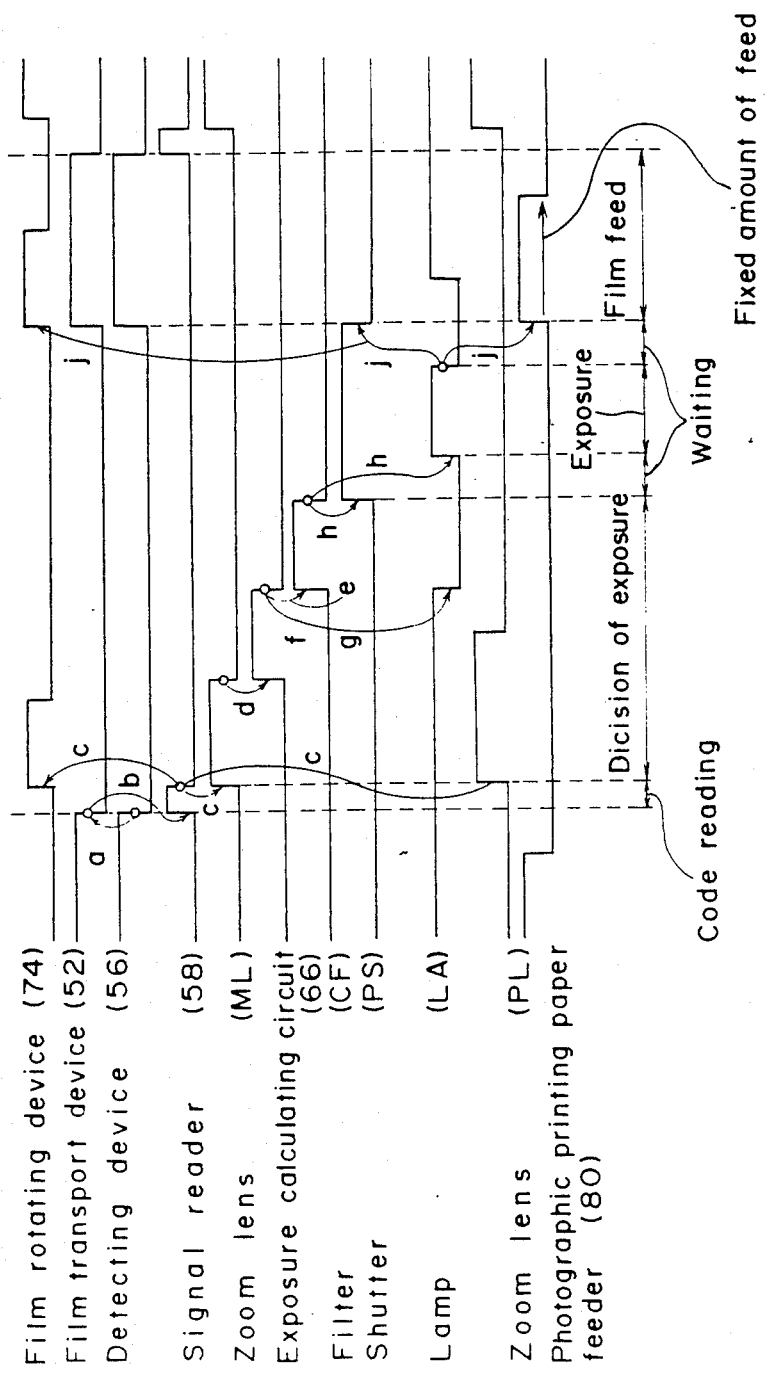
FIG. 19 is a time chart showing operations of the automatic printer of FIG. 18.

Hereinbelow, constructions and operations of the automatic printer are described. Initially, a lamp control circuit 50 performs on-off control of the lamp LA. The lamp LA is used not only as a light source for printing but for detecting an edge of the frame, for reading codes imprinted on the film and for performing light measurement for determining color balance and exposure amount. Reference numeral 52 denotes a film transport device for feeding to a carrier of the automatic printer the film photographed by the above described camera. The film transport device 52 transports the film F in the rightward direction in FIG. 18. Photographic density of the film transported in the rightward direction of FIG. 18 is monitored by a CCD line sensor or MOS type line sensor 54 whose output is applied to an edge detecting device 56 for detecting an edge of the frame. When change of photographic density of the film is detected by the edge detecting device 56, transport of the film by the film transport device 52 is stopped. Namely, as will be seen from a time chart of FIG. 19, transport of the film is stopped in response to a positive edge of a signal a inputted from the edge detecting device 56 to the film transport device 52 such that one frame of the film is disposed at the printing position accurately. Meanwhile, after completion of printing, the film is sequentially wound by a film winding device (not shown).

When transport of the film is stopped, a signal reader 58 is actuated by a signal b delivered from the film transport device 52 such that a signal imprinted in the vicinity of a frame disposed at the printing position of the film F is read by the signal reader 58 through a sensor 60. Namely, a photographing mode signal regarding the photographing modes of the frame to be printed is read by the signal reader 58. The photographing mode signal read by the signal reader 58 is transmitted, as a signal c, to a control unit 62 for changing over printing magnification of the printing zoom lens PL and a control unit 64 for changing over magnification of a light measuring zoom lens ML. In the case where the vertically elongated pseudo focal length photographing mode is designated at the time of photographing the object, light measuring zone on the frame and enlargement magnification on the photographic printing paper are changed over by the zoom lenses ML and PL, respectively. The signal c is also transmitted to a film rotating device 74 such that the film is rotated through 90° by the film rotating device 74. By this arrangement, even if the vertically elongated pseudo focal length photographing mode is designated at the time of photographing the object, only the printing zone can be subjected to light measurement accurately.

When changeover of magnification of the light measuring zoom lens ML has been completed by the control unit 64, exposure calculation of an exposure calculating circuit 66 is performed by a signal d indicative of completion of changeover of magnification of the light measuring zoom lens ML. This exposure calculation is performed on the basis of an output of a light measuring circuit 68 for receiving, through the light measuring zoom lens ML, light from the frame disposed at the printing position so as to calculate color balance and amount of exposure corresponding to the frame. Information of this calculated color balance is transmitted, as a signal e, to a filter control unit 70 so as to be used for adjusting the color balance. Meanwhile, information of the amount of exposure is transmitted, as a signal f, to the lamp control circuit 50 so as to be used for determining amount of light emitted by the lamp LA. Furthermore, a signal g indicative of completion of light measurement is also transmitted from the exposure calculating circuit 66 to the lamp control circuit 50 so as to turn off the lamp LA temporarily.

Subsequently, the filter control unit 70 sets the color filters CF in accordance with the information of the color balance from the light measuring circuit 68. Upon completion of setting of the color filters CF by the filter control unit 70, a signal h indicative of completion of setting of the color filters CF is outputted from the filter control unit 70. This signal h is transmitted to the lamp control circuit 50 and a shutter control unit 72 for controlling opening and closing of a shutter PS provided forwardly of the photographic printing paper PP disposed at the printing position. Immediately after the signal h is inputted to the shutter control unit 72, the shutter control unit 72 starts opening the shutter PS. Meanwhile, upon lapse of a predetermined time period after input of the signal h to the lamp control unit 50 until the shutter PS is fully opened, the lamp control unit 50 turns on the lamp LA for printing. A time period for turning on the lamp LA and luminous intensity of the lamp LA are controlled by the lamp control circuit 50 in accordance with the information of the amount of exposure. Then, upon completion of printing by the lamp LA, the lamp control circuit 50 turns off the lamp LA and then, outputs a signal j indicative of completion of exposure. In response to the signal j, the film transport device 52 starts feeding the film and the shutter control unit 72 closes the shutter PS. Meanwhile, in the case where the film has been rotated through 90° in order to print a frame of the film designated by the vertically elongated pseudo focal length photographing mode, the film is reversely rotated to the original state through 90°.

Furthermore, in response to the signal j, a photographic printing paper feeder 80 feeds the photographic printing paper PP in the rightward direction in FIG. 18 so as to be ready for the next printing. Meanwhile, in response to the signal j, the device 56 for detecting the edge of the frame, the signal reader 58, the exposure calculating circuit 66 and the filter control unit 70 are reset so as to be ready for the next printing. Then, the printed photographic printing paper is sequentially stored in a device (not shown) for accommodating therein the printed photographic printing paper. Thus, in the automatic printer of the embodiment, proper printing for the designated photographing mode is automatically performed.

As is clear from the foregoing description, in one aspect of the present invention, the photographic camera enabling photography in the pseudo focal length photographing mode comprises the mode setting means for selectively setting the photographic camera to the real focal length photographing mode for printing the ordinary photographic zone and the pseudo focal length photographing mode for printing the zone narrower than the ordinary photographic zone and the data imprinting means for imprinting data such as date in the printing zone on the film not only when the photographic camera has been set to the real focal length photographing mode but when the photographic camera has been set to the pseudo focal length photographing mode.

Therefore, in accordance with the present invention, since the data are imprinted in the printing zone on the film even if photography in the pseudo focal length photographing mode has been performed, it becomes possible even in the pseudo focal length photographing mode to obtain a print having the data imprinted accurately thereon. Furthermore, in accordance with the present invention, since it is merely necessary to provide only a single data imprinting means and changeover of the data imprinting means is not required to be performed, the photographic camera is simplified in structure.

Moreover, in another aspect of the present invention, the photographic camera characteristically comprises the mode setting means for selectively setting the photographic camera to the real focal length photographing mode for printing the ordinary photographic zone and the pseudo focal length photographing mode for printing the zone narrower than the ordinary photographic zone and the storage means for storing on the film the signal commanding, when the photographic camera has been set to the pseudo focal length photographing mode, printing of the printing zone having a ratio of its vertical dimension to its horizontal dimension different from that of the printing zone for the real focal length photographing mode. By this arrangement of the photographic camera of the present invention, since the vertically elongated print having the vertical dimension larger than the horizontal dimension can be easily obtained without changing posture of the photographic camera, thereby eliminating such inconveniences as deterioration of operating efficiency of the photographic camera and improper printing due to formation of unnatural shadows in the print.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A photographic camera system comprising:
    means for selectively setting the camera system to one of a real focal length photographing mode in which an ordinary photographic zone of a film is to be printed and a pseudo focal length photographing mode in which a photographic zone of the film narrower than the ordinary photographic zone is to be printed;
    means for recording mode setting data corresponding to a mode set by said setting means;
    means for imprinting chronometric data at a predetermined common location of the film included within both the ordinary photographic zone and the narrower photographic zone.

2. A photographic camera system as claimed in claim 1, wherein said chronometric data imprinted by said data imprinting means are data indicating year, month and day.

3. A photographic camera system as claimed in claim 1, wherein said chronometric data imprinted by said data imprinting means are data indicating day, hour and minute.

4. A photographic camera which is capable of selectively taking either of a vertical picture having a vertical dimension larger than a horizontal dimension and a normal picture having an aspect ratio substantially equal to that of a normal frame of film, without turning the camera about its optical axis, comprising:
    means for selecting one of a vertical picture mode for taking said vertical picture and a normal picture mode for taking said normal picture;
    means for recording a signal commanding, when the vertical picture mode is selected, to print a photographic zone of a frame of the film defined by a vertical dimension equal to a vertical dimension of the normal frame of the film and a horizontal dimension shorter than a horizontal dimension of the normal frame, the ratio of the vertical dimension to the horizontal dimension of said zone being substantially equal to the ratio of the horizontal dimension to the vertical dimension of the normal frame;
    means for displaying in a viewfinder of the camera the field equivalent to the vertical printing zone when the vertical picture mode is selected; and
    means for winding said film by a predetermined length when either of the vertical picture mode and the normal picture mode is selected.

5. The photographic camera of claim 9, wherein when the vertical picture mode is selected, the horizontal dimension of the printing zone is centered within the normal frame.

* * * * *